United States Patent
Schmidl et al.

(10) Patent No.: US 10,680,861 B2
(45) Date of Patent: Jun. 9, 2020

(54) WIRELESS NETWORKS UTILIZING MULTIPLE MODULATIONS

(71) Applicant: Texas Instruments Incorporated, Dallas, TX (US)

(72) Inventors: Timothy Mark Schmidl, Dallas, TX (US); Srinath Hosur, Plano, TX (US); Anuj Batra, Mountain View, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 123 days.

(21) Appl. No.: 15/899,310

(22) Filed: Feb. 19, 2018

(65) Prior Publication Data

US 2018/0176052 A1 Jun. 21, 2018

Related U.S. Application Data

(63) Continuation of application No. 13/566,639, filed on Aug. 3, 2012, now Pat. No. 9,900,193.

(60) Provisional application No. 61/521,598, filed on Aug. 9, 2011.

(51) Int. Cl.
*H04L 27/00* (2006.01)
*H04L 27/26* (2006.01)

(52) U.S. Cl.
CPC ...... *H04L 27/0012* (2013.01); *H04L 27/2613* (2013.01)

(58) Field of Classification Search
CPC . H04L 27/2613; H04L 5/0053; H04L 5/0007; H04L 5/0048; H04W 84/12
See application file for complete search history.

(56) References Cited

U.S. PATENT DOCUMENTS

2004/0165564 A1* 8/2004 Kim ................ H04L 27/0008
370/338
2011/0255557 A1 10/2011 Varadarajan et al.

OTHER PUBLICATIONS

IEEE, "Physical Layer Specifications for Low Data Rate Wireless Smart Metering Utility Networks", May 2011, IEEE, P802.15.4g/ D5, pp. 1-212, which was cited in the parent case. (Year: 2011).*
IEEE, "Physical Layer Specifications for Low Data Rate Wireless Smart Metering Utility Networks", May 2011, IEEE, P802.15.4g/ D5, pp. 1-212.
Prosecution History for U.S. Appl. No. 13/566,639, from Aug. 3, 2012 through Feb. 1, 2018, 333 pages.

* cited by examiner

*Primary Examiner* — Jung H Park
(74) *Attorney, Agent, or Firm* — Brain D. Graham; Charles A. Brill; Frank D. Cimino

(57) ABSTRACT

A method of communicating in a wireless network including a plurality of nodes having communications devices including a first node, wherein at least one node utilizes a first physical layer (PHY) modulation, and at least one other node utilizes a second PHY modulation different from the first PHY modulation. The first node receives a PHY frame transmitted by one of the plurality of nodes, and identifies a PHY modulation type selected from the first PHY modulation and the second PHY modulation used in the PHY frame or to be used in a subsequently to be received PHY frame or frame portion. The first node decodes the PHY frame or the subsequently to be received PHY frame or frame portion using the PHY modulation type identified in the identifying step.

20 Claims, 3 Drawing Sheets

METHOD 700

701 — A FIRST NODE RECEIVES A PHY FRAME TRANSMITTED BY ONE OF A PLURALITY OF NODES IN A WIRELESS NETWORK INCLUDING A PLURALITY OF NODES HAVING COMMUNICATIONS DEVICES INCLUDING AT LEAST ONE NODE WHICH UTILIZES A FIRST PHYSICAL LAYER (PHY) MODULATION, AND AT LEAST ONE OTHER NODE UTILIZES A SECOND PHY MODULATION DIFFERENT FROM THE FIRST PHY MODULATION

702 — IDENTIFYING A PHY MODULATION TYPE SELECTED FROM THE FIRST PHY MODULATION AND SECOND PHY MODULATION USED IN THE PHY FRAME RECEIVED OR TO BE USED IN A SUBSEQUENTLY TO BE RECEIVED PHY FRAME OR FRAME PORTION

703 — DECODING THE PHY FRAME OR THE SUBSEQUENTLY TO BE RECEIVED PHY FRAME OR FRAME PORTION USING THE PHY MODULATION TYPE IDENTIFIED IN STEP 702

WIRELESS NETWORKS UTILIZING MULTIPLE MODULATIONS

CROSS REFERENCE TO RELATED APPLICATIONS

This application is a continuation of U.S. patent application Ser. No. 13/566,639 and the subject matter disclosed herein claims the benefit of Provisional Application Ser. No. 61/521,598 entitled "MULTIPLE PREAMBLE DETECTION FOR SMART UTILITY NETWORKS" filed Aug. 9, 2011, both of which are herein incorporated by reference in their entirety.

FIELD

Disclosed embodiments relate generally to the field of wireless networks, and, more specifically to physical layer (PHY) detection in wireless networks.

BACKGROUND

There are a wide variety of wireless networks. A smart utility network (SUN) is a low data rate (40 kb/s to 1 Mb/s), low power wireless technology that is specifically designed to be used in utility metering applications, such as transmitting electric, gas, or water usage data from the meter(s) on the customer's premises to a data collection point (hub) operated for the utility. For example, meters can be installed for each house in a residential neighborhood, and then the data can be sent every 15 minutes from each meter to a poletop data collection point. This data collection point could then be connected by fiber, copper wire, or wirelessly to a central office which collects all the data for a region. Data can either be sent directly from each meter to the collection point (star configuration), or can be hopped from meter to meter until it reaches the collection point (mesh configuration).

There are different physical layers (PHY) modulation types that can be used for SUN communications including frequency shift keying (FSK), DSSS (direct sequence spread spectrum), and orthogonal frequency division multiplexing (OFDM). In a closed utility network the devices that are allowed into the network can be controlled by the utility or the network operator.

A network can also be set up in a mesh configuration where devices can communicate with neighboring devices rather than just with a hub. This helps to increase coverage since communication can be achieved even if the link directly to the hub is not good. However, this can increase the amount of traffic that goes through some devices since they have to include frame data from their neighbors as well as their own data. A mesh network can be appropriate for an urban or suburban area with a high density of meters and non-line-of-sight conditions between meters so that communication links between some meters and a hub is poor.

A star configuration is a configuration where a hub communicates directly with each meter. This configuration can be appropriate for rural environments when the density of meters is low so that there may not be a convenient neighbor to use as an intermediate hop. A mix between a star and mesh configuration can also be used in some deployments.

Since utility meters typically have a long life span, such as 20 years or more, there may be several different generations of meters deployed in a given utility network. The earlier generation deployed meters can be termed "legacy equipment" and be configured to only support FSK, while newer generation equipment may support higher data rate DSSS and/or OFDM in addition to FSK in what may be termed a "mixed modulation equipment" network. In a typical mixed modulation equipment embodiment, since multiple modulations cannot be simultaneously supported, the utility network will be forced to have all the devices communicate using FSK, at the low relative fixed data rate supported by FSK, such as 50 kb/s, 100 kb/s or 153 kb/s. In addition, more generally in wireless networks, mixed modulations can be used for purposes other than smart utility networks such as data, video, or voice transmission.

SUMMARY

Disclosed embodiment solve the data rate problem in wireless networks having mixed modulation equipment by disclosing physical layer (PHY) detection to support network communications utilizing a plurality of different PHY modulation types. For example, in the case of smart utility network (SUNs), different generations of meters may be deployed in a given utility network which each utilize different PHY modulations, such as FSK for legacy equipment and DSSS and/or OFDM for newer equipment. Disclosed methods perform PHY modulation type identification that allows the receiver to identify the PHY modulation being used for a particular frame to allow decoding of the frame, to enable multiple PHY modulation types to be simultaneously used and coexist in a wireless network, such as a wireless network having both legacy equipment and newer equipment.

The PHY modulation type identification can comprise preamble detection using cross correlation and/or delayed correlation of a received frame. Cross correlation involves a correlation computed between received samples and known (reference or replica) samples. Delayed correlation involves the correlating computed between received samples and delayed received samples.

BRIEF DESCRIPTION OF THE DRAWINGS

Reference will now be made to the accompanying drawings, which are not necessarily drawn to scale, wherein.

DETAILED DESCRIPTION

Figure 1A:
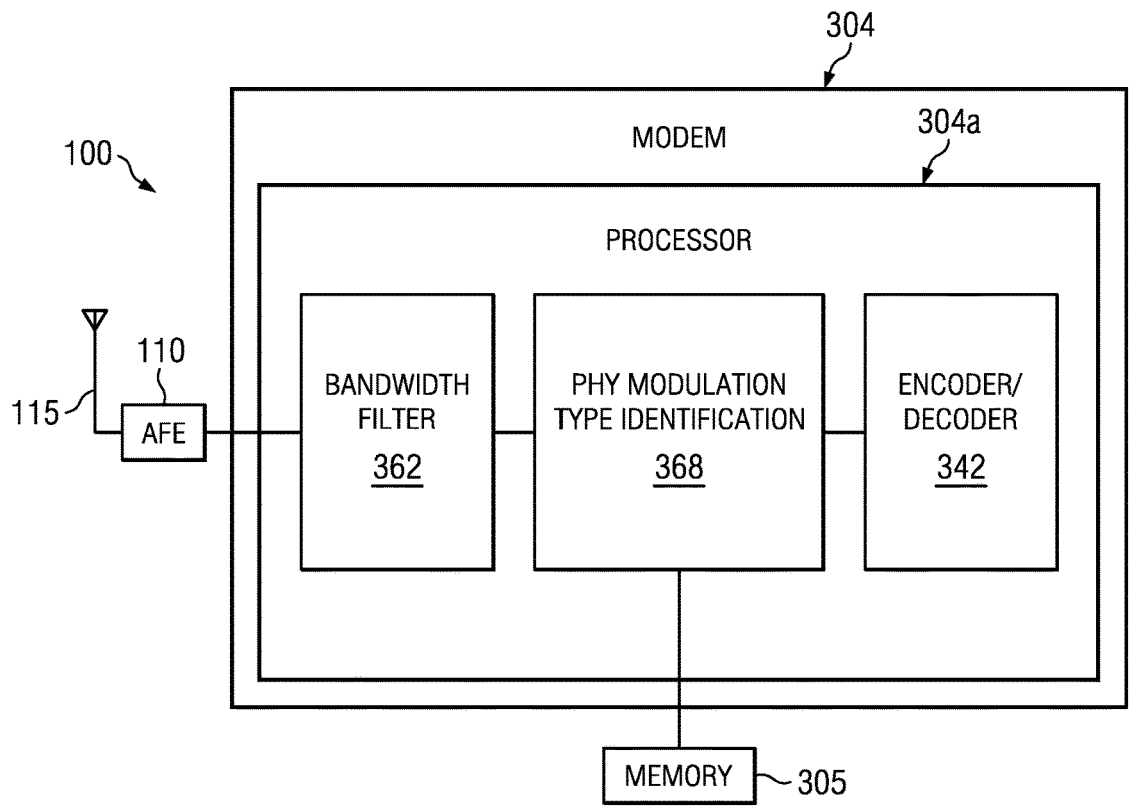
FIG. 1A is a simplified block diagram depiction of an example wireless receiver including a PHY modulation type identification block, according to an example embodiment.

Disclosed embodiments now will be described more fully hereinafter with reference to the accompanying drawings. Such embodiments may, however, be embodied in many different forms and should not be construed as limited to the embodiments set forth herein. Rather, these embodiments are provided so that this disclosure will be thorough and complete, and will fully convey the scope of this disclosure to those having ordinary skill in the art. One having ordinary skill in the art may be able to use the various disclosed embodiments and there equivalents. As used herein, the term "couple" or "couples" is intended to mean either an indirect or direct electrical connection, unless qualified as in "communicably coupled" which includes wireless connections. Thus, if a first device couples to a second device, that connection may be through a direct electrical connection, or through an indirect electrical connection via other devices and connections.

As described above, wireless networks may have mixed modulation equipment, and since multiple modulation types cannot be simultaneously supported, the network will be forced to have all the devices communicate using the lowest data rate modulation type used in the network. In the case of SUNS, the legacy equipment in SUN's may use FSK modulation. The FSK PHY data frame for a SUN can include a preamble ("01010101") repeating bit pattern of at least 4 bytes (32 bits), followed by a 16 bit (or 32 bit, 64 bit, etc.) start frame delimiter (SFD), followed by the payload of the frame. For a 50 kb/s FSK transmission, the repetition period of the preamble is 40 microseconds, which means that every 40 microseconds another "01" bit pattern is transmitted. For 153 kb/s FSK, the repetition period is about 13 microseconds. In general the FSK preamble should be at least one byte, and it can alternatively have the opposite pattern "10101010".

FSK typically uses two frequencies (2FSK) or four frequencies (4FSK) to transmit data. The modulation index is the ratio of the spacing between consecutive frequencies in the FSK symbol map to the symbol rate. Thus, for 50 kb/s FSK with a modulation index of 1.0, the frequency deviations are +25 kHz and −25 kHz. Typical modulation indexes are 0.5 and 1.0.

As described above, some SUN equipment may also use DSSS modulation. The DSSS PHY may use the offset QPSK (O-QPSK) modulation with a chip rate of either 100 kchip/s, 1,000 kchip/s, or 2,000 kchip/s. The term "offset" means that the in-phase (I) and quadrature (Q) channels are offset by half of a chip time. For the 100 kchip/s mode, there is a preamble of 32 zeros with each bit spread by a spreading code of length 32. This results in a preamble of length 10240 microseconds with a repetition period of 320 microseconds. For the 1000 kchip/s mode, there is a preamble of 56 zeros with each bit spread by a spreading code of length 64. This results in a preamble of length 3,584 microseconds with a repetition period of 64 microseconds. For the 2,000 kchip/s mode, there is a preamble of 56 zeros with each bit spread by a spreading code of length 128. This results in a preamble of length 3,584 microseconds with a repetition period of 64 microseconds.

Regarding OFDM, the cyclic prefix (CP) generally provided is ¼ of the useful part of the OFDM symbol. The CP is added at the transmitter and removed at the receiver to make a linear convolution become a "circular" convolution. The repetition period of the STF is 24 microseconds since there are 5 repetitions of the STF within one 120 microsecond OFDM symbol. The long training field (LTF) occupies all the active tones and occupies two OFDM symbols.

As described above, an example wireless networks having mixed modulation equipment is a SUN, such as the SUN after legacy utility meters running FSK are replaced which support a different PHY, for example OFDM in order to support a higher data rate or better signal range. In this case, the SUN includes both FSK and OFDM network nodes. In this example, since the legacy meters only use FSK, then FSK must be supported in the network. However, if there are newer meters which support OFDM, then these newer meters can communicate more efficiently (e.g., at a higher data rate as compared to FSK) using OFDM. There are several disclosed methods of simultaneously supporting multiple PHY modulation types in a wireless network described below.

FIG. 1A is a simplified block diagram depiction of an example wireless receiver 100 including an antenna 115 coupled to an analog front end (AFE) block 110, according to an example embodiment. AFE block 110 includes an RF front end including an automatic gain control (AGC) and analog-to-digital converters (ADC). AFE block 110 generally provides the transceiver (TX/RX) function and is coupled to the modem 304 shown.

Modem 304 includes a processor 304a that is coupled to a memory 305 which stores a disclosed PHY modulation type identification algorithm implemented by processor 304a, including an optional bandwidth adjustment filter 362, which can be a band pass or low pass filter. A PHY modulation type identification block 368 in coupled to the memory 305 to implement the PHY modulation type identification algorithm.

There are three example arrangements disclosed below for identifying a PHY modulation type that can be implemented by PHY modulation type identification block 368. As described in more detail below, the identifying can comprise preamble detection (using cross correlation, and/or delayed correlation, with the possibility of mix and match of cross correlation and delayed for detection for the respective modulations) of a received frame to identify the modulation type. Cross correlation involves correlating computed between received samples and known (reference or replica) samples. Delayed correlation involves correlating computed between received samples and delayed received samples. The identifying can comprise reading an instruction (e.g., a 2 bit sequence) in a received frame that reveals the modulation type in the rest of current from or for next frame(s). The instruction can be in any part of the frame, including data payload. The identifying can also comprise utilizing stored modulation information to enable knowing the modulation type of a received frame or received frame portion.

Providing bandwidth filter 362 before PHY modulation type identification block 368 can filter the received samples of the PHY frame to the correct bandwidth, unless the PHY already occupies the entire bandwidth that is sampled, in which case, bandwidth filter 362 leaves the signal bandwidth unchanged. For example, if the PHY frame received by receiver 100 is a DSSS PHY which occupies a 2 MHz channel, then the I,Q samples would need to be taken by modem 304 at a rate of at least 2 Msps (mega samples per second). If the PHY frame received by receiver 100 is a FSK PHY which occupies a 200 kHz channel, then the incoming samples can be filtered by bandwidth filter 362 to this lower bandwidth (200 kHz) to reduce the effects of noise and interference that are out of the desired channel.

Similarly, if the PHY frame received by receiver 100 is an OFDM PHY, the OFDM PHY is typically also filtered to lower the channel bandwidth. The bandwidth filter 362 can also be shared between the FSK PHY and OFDM PHY if they use a similar bandwidth, or some stages of filtering can be shared if one PHY type has a larger bandwidth than another PHY type, such as OFDM having a higher bandwidth than FSK.

Figure 1B:
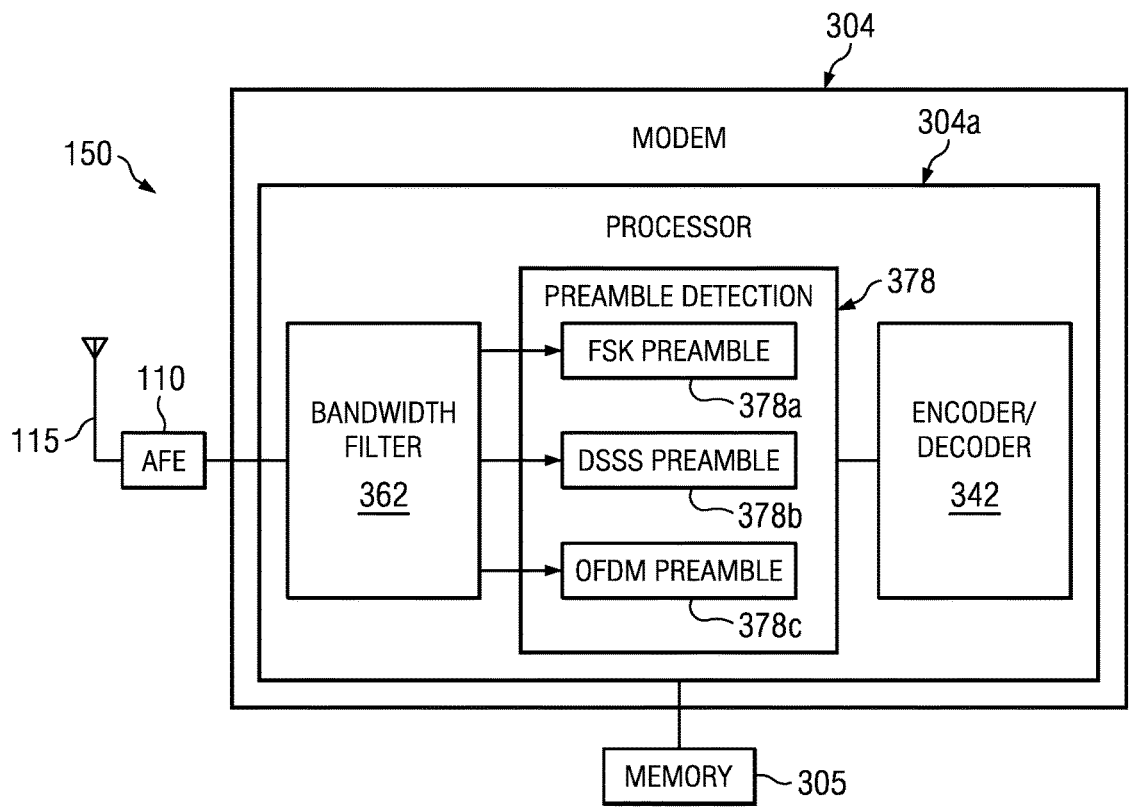
FIG. 1B is a simplified block diagram depiction of an example wireless receiver where the PHY modulation type identification block comprises a preamble detection block, according to an example embodiment.

FIG. 1B is a simplified block diagram depiction of an example wireless receiver 150 where the PHY modulation type identification block comprises a preamble detection block 378, according to an example embodiment. Preamble identification block 378 is shown including three parallel preamble detectors 378a, b, and c which each operate on the same received samples after possible bandwidth filtering by bandwidth filter 362.

The preamble detection block 378 is configured to detect the PHY modulation type in the PHY frame received from its preamble from two or more PHY modulations being used in the wireless network. Preamble detection block 378 can implement one or more of cross correlation and delayed correlation (e.g., detecting a repetition period of the preamble). As noted above, it is possible to mix and match, so that cross correlation can be used for detecting at least one modulation type and delayed correlation can be used for detecting at least one other modulation type. Moreover, cross correlation and delayed correlation may be used together (sequentially) to detect one or more modulation types.

In one embodiment, preamble detection block 378 comprises both cross correlation and delayed correlation, where cross correlation is used to validate the PHY modulation type determined by delayed correlation based on the repetition period. In another embodiment, preamble detection block 378 consists of only cross correlation.

Figure 2:
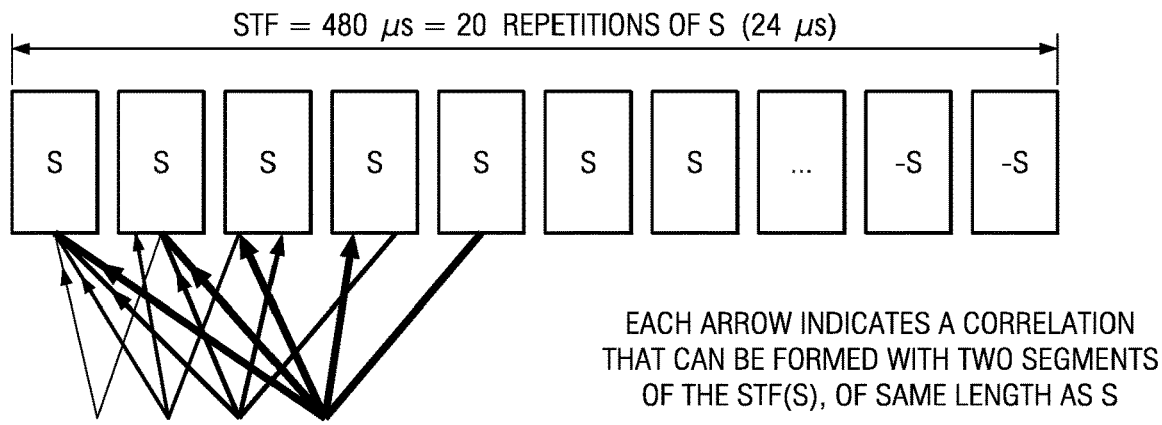
FIG. 2 shows the repetition pattern of a short training field (STF) used in conventional OFDM preambles along with arrows indicating disclosed delayed correlations that can be formed from two STF segments shown as S's, according to an example embodiment.

Preamble identifiers to implement preamble detection block 378 will now be described for OFDM, FSK and DSSS. Regarding OFDM preamble identification, FIG. 2 shows the repetition pattern of a STF used in conventional OFDM preambles along with arrows indicating disclosed correlations that can be formed from two STF segments each shown as S's, according to an example embodiment. The STF occupies 4 OFDM symbols, so for 120 microsecond symbols, the total duration of the STF is 480 microseconds as shown in FIG. 2. The STF occupies every fourth tone, so this creates a repetition of 4 within the STF FFT duration. Each repetition of the STF is denoted as a segment "S" as shown in FIG. 2. Including a CP of ¼ FFT duration results in 20 repetitions within the 4 STF OFDM symbols. The last two repetitions are negated (shown in FIG. 2 as −S) in order to aid boundary detection of the change from the STF to the long training field (LTF) portion of the preamble. The LTF is transmitted immediately after the STF in conventional OFDM preambles.

Each arrow in FIG. 2 indicates a correlation that can be formed from two S's referred to herein as "delayed correlations", as these correlations are calculated from delayed received samples. Such correlation can be performed in multiple layers. The first layer can be correlation of adjacent repetitions of S. Since there are 18 non-negated repetitions in the OFDM example described herein, there are 17 possible correlations for this first layer. The second layer can be formed by making correlations that are separated by an extra repetition, such as 2 repetitions, so there are 16 possible correlations for this second layer.

Figure 3:
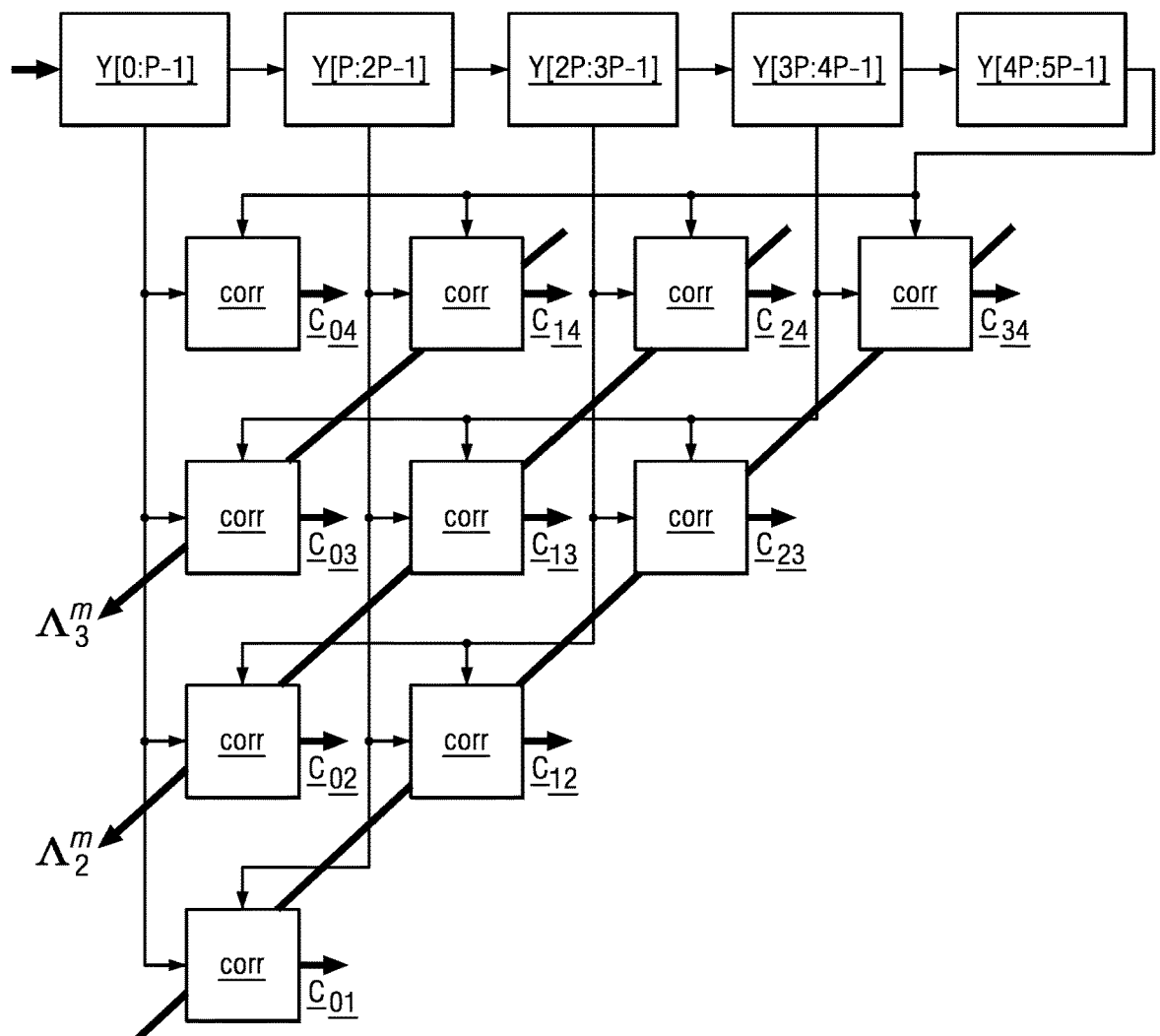
FIG. 3 shows an example how disclosed delayed correlations can be calculated along diagonals, according to an example embodiment.

FIG. 3 shows an example how disclosed delayed correlations can be calculated along diagonals. The correlations in each layer can be summed along the diagonals as shown in FIG. 3 because the carrier frequency offset causes the same phase rotations for the correlation values for each layer. The absolute values of the lambda ($\Lambda_1$, $\Lambda_2$, $\Lambda_3$) values are summed to obtain the frame detection metric. Typically, after adding the first five layers there is little advantage from including additional layers. Each delayed correlation value (C) can be computed by adding one new value and subtracting one old value.

$$C_{k,i}^m(n) = \sum_{l=0}^{P-1} y_m(n-kP-l)y_m^*(n-iP-l)$$

$$= \begin{array}{l} C_{k,i}^m(n-1) + y_m(n-kP)y_m^*(n-iP) - \\ y_m(n-(k+1)P)y_m^*(n-(i+1)P) \end{array}$$

This delayed correlation metric (C) provides a high value when a repeated signal pattern is present with the correct repetition period fed into the delayed correlator.

An alternative frame detection and identification method for OFDM is to correlate with a known transmitted signal such as a STF (referred to herein as a "cross correlation"). As with the above described delayed correlation, a high correlation value in this example indicates that the OFDM STF is present in the preamble. Cross correlation generally performs than the above-described delayed correlation at lower signal-to-noise ratios. However, the cross correlation can be more sensitive to carrier frequency offsets. In contrast to delayed correlation upon which correlating is computed between delayed received samples, cross correlation is computed between receive samples and known samples, such as transmitted samples $t_m$ as shown in the equation below.

$$C_{k,i}^m(n) = \sum_{l=0}^{P-1} y_m(n-kP-l) \; t_m^*(n-iP-l)$$

A FSK preamble detector can be implemented using delayed correlation. A similar delayed correlation metric can be used for FSK preamble detection as the OFDM delayed correlation metric described above, except that the repetition period for the FSK PHY will typically be different as compared to the repetition period for the OFDM PHY. The FSK frame detector can be set to detect frames with a repetition period of 13 microseconds (153 kb/s FSK) versus 24 microseconds for the OFDM PHY. If the frame detection metric rises for the 13 microseconds repetition period, then it is likely that the PHY is FSK. If the frame detection metric rises for the 24 microseconds repetition period, then it is likely that the PHY is OFDM. For 100 kb/s FSK, the repetition period is 20 microseconds, and for 50 kb/s FSK the repetition period is 40 microseconds.

A FSK identifier can also be implemented using cross correlation. The FSK preamble is known to be a repetitive pattern of "01010101" bytes, so the received signal can be correlated against the known transmitted preamble. If there is a high correlation, this indicates that the FSK preamble is present.

An alternative frame detection method for FSK is to use the repetitive preamble ("01010101" pattern) to estimate the carrier frequency offset and then search for a 16 bit (or 32 bit) SFD to detect and identify an FSK frame. There are sometimes 2 SFD's used for conventional FSK to indicate whether convolutional coding is used for the frame or not. One SFD is associated with convolutional coding, and the second SFD is associated with no convolutional coding used at the transmitter.

A DSSS preamble detector can be implemented using delayed correlation. A similar delayed correlation metric can be used as the OFDM delayed correlation metric described above, except that the repetition period for the DSSS PHY will typically be different than the repetition period for the OFDM PHY. The frame detector can be set to detect frames with a repetition period of 64 microseconds (1,000 or 2,000 kchip/s DSSS) or 320 microseconds (100 kchip/s DSSS).

A DSSS preamble detector can be implemented using cross correlation. The receiver can search for the DSSS preamble by correlating with the known transmitted preamble. Because the entire DSSS preamble is relatively long, the receiver can correlate with one repetition at a time to minimize the effects of carrier frequency offsets to the correlation values. Because there are either 32 or 56 repetitions for the DSSS synchronization header, the receiver may detect the preamble but not know where is the boundary which is the end of the synchronization header. The receiver can then correlate to find the 16-bit start frame delimiter which indicates the end of the synchronization header.

In a first PHY modulation type identification embodiment, the receiver has multiple PHY modulation hypotheses for each frame (such as FSK, OFDM or DSSS being the received PHY frame) and searches for the preamble of all possible PHY types configured to be used in the network. Upon successfully detecting a preamble for a particular PHY, the receiver can decode the frame for that PHY.

As described above, the three parallel preamble detectors 378a, b, and c shown in FIG. 1B operate on the same received samples after possible bandwidth filtering by bandwidth filter 362. In this embodiment, all three preamble detectors 378a, b, and c can use disclosed delayed correlation to search for a preamble with the appropriate repetition period for each candidate PHY preamble. Upon triggering one of the preamble detectors 378a, b, and c, cross-correlation can be added to confirm or validate the modulation technique identified by delayed correlation. The validation for FSK and DSSS can be either cross-correlation with the preamble pattern or with the start frame delimiter. For OFDM the validation can be cross-correlation using either the short training field (STF) or long training field (LTF).

For example, the delayed correlation can be used to search for a preamble for each of the PHYs taking the different repetition periods into account. For example to differentiate between 153 kb/s FSK, 1 Mchip/s DSSS, and OFDM the repetition periods for the delayed correlation are 13 microseconds, 64 microseconds, and 24 microseconds, respectively. Whichever delayed correlation metric is triggered by having a high correlation can indicate which PHY modulation is likely to be present in the received signal. A confirmation can be done by searching for the SFD for FSK or DSSS or for OFDM searching for the negated STF symbols or finding the LTF symbols. In the case of a utility network, since the utility network is generally closed, the receiver can be configured to search for any subset of possible PHYs, such as FSK+OFDM or FSK+DSSS or FSK+DSSS+OFDM.

Figure 4:
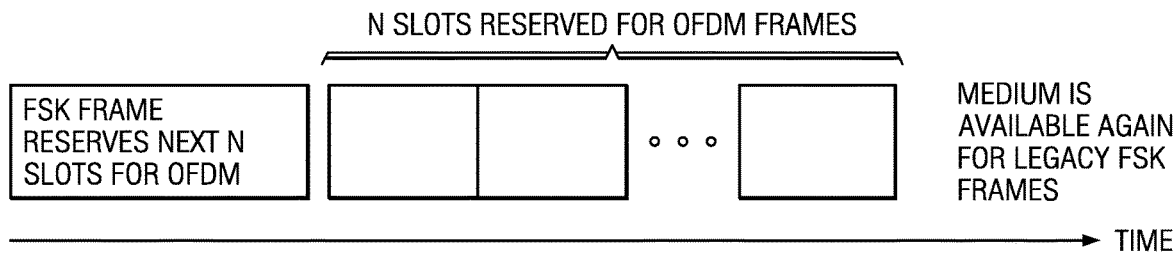
FIG. 4 shows how a legacy FSK frame can be used to announce to the network that the next N frames will use an alternative modulation technique, such as OFDM or DSSS, according to an example embodiment.
Figure 5:
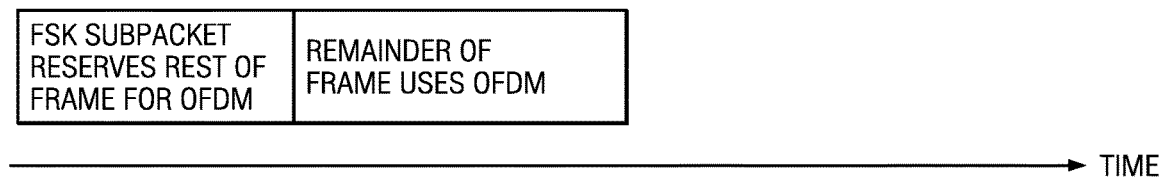
FIG. 5 shows how a legacy FSK format is used to instruct a receiver that the rest of the frame will use another modulation format, such as OFDM or DSSS, according to an example embodiment.

In a second PHY modulation type identification embodiment, communication is started with a baseline PHY such as FSK, and this FSK frame instructs (e.g., using a particular bit sequence) the receiver 100 to change to another PHY if it is appropriate for the rest of the current frame or for the next frame. For example, as shown in FIG. 4, a legacy FSK frame can be used to announce to the network that the next N frames will use an alternative modulation technique, such as OFDM or DSSS. In this FIG., OFDM could be replaced with DSSS. In FIG. 5, a legacy FSK format which uses an FSK preamble, SFD, and payload with an instruction is used to instruct the receiver that the rest of the frame will use another modulation format such as OFDM or DSSS.

For the second PHY modulation type identification embodiment the frame can start with FSK transmission. This enables the receiver to search for only a single preamble for FSK. Then when the FSK frame is detected the start of the FSK frame can indicate that another PHY is present for the rest of the frame or for the next frame. For example there can be a bit sequence in FSK indicating that the rest of the frame can use DSSS or OFDM. This change in PHY can also be set to last for many frames or until notification is sent that another PHY is to be used.

In a third PHY modulation type identification embodiment the choice of the PHY is made at a higher layer. For example, each communications device can have a list of its nearest neighbors along with the capabilities of each neighbor such as the PHYs supported. For example, when a new device joins the network the list of nearest neighbors can be obtained from a neighbor. Thus, when a frame communication is scheduled both the transmitter and receiver will know the PHY modulation type to be used as part of the scheduling.

A higher layer schedules frame communication between devices. Along with scheduling the time of the frame communication, the PHY to be used is also scheduled. The receiver then wakes up at the appropriate scheduled time and searches for the preamble of the PHY that it is scheduled to receive. If a communications device in the network supports two modulations, the choice can be made using a higher layer which can schedule the type of modulation to use. It may try to use the modulation common to both devices which supports a higher data rate (for example OFDM or DSSS instead of FSK) since this modulation is more efficient and will occupy a lower time over the air.

Figure 6:
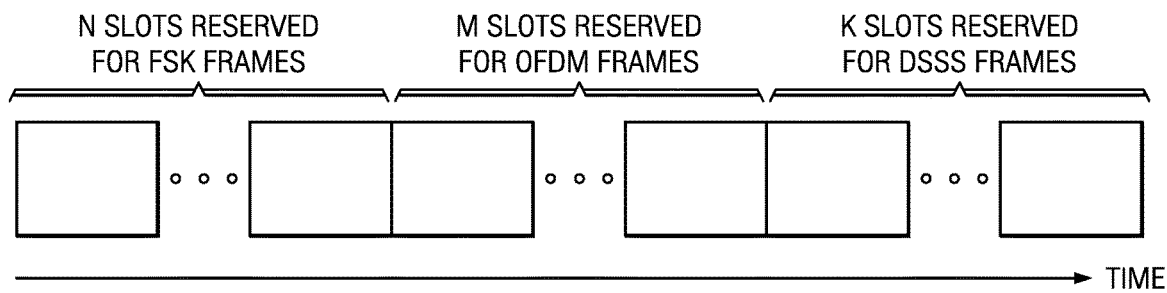
FIG. 6 shows transmissions divided into time slots with some slots being assigned to one PHY such as FSK, and other slots being assigned to another PHY, such as OFDM, according to an example embodiment.

In a fourth PHY modulation type identification embodiment, as shown in FIG. 6, transmissions are divided into time slots with some slots ("first time slots") being assigned to one PHY such as FSK, and other slots ("second time slots") being assigned to another PHY, such as OFDM. The network is synchronized to use time slots, such as using a super-frame described below. Some of the time slots can be designated to use one PHY such as FSK, and other time slots can be designated to use another PHY, such as OFDM. When a receiver is listening for a preamble it can thus search for only the PHY preamble for the time slot that it is monitoring.

The interval between beacons, such as provided in a super-frame which includes frequency assignments, timing assignments, and a plurality of beacon frames, can be divided into time slots, where for each time slot the communications devices will only be able to transmit information using a particular known modulation technique. For example, as shown in FIG. 6, the first N time slots can be dedicated to FSK modulation, the second M time slots can be dedicated to OFDM modulation, and third K time slots can be dedicated to DSSS modulation (N>=0, M>=0, K>=0).

The beacons can contain information about which time slots are dedicated to which modulation techniques. Modulation information can be specified using a bit map or by specifying the variables N, M and K. The values for N, M and K can be fixed in advance by the company or individual (s) designing the network and thus known to the higher layers.

Figure 7:
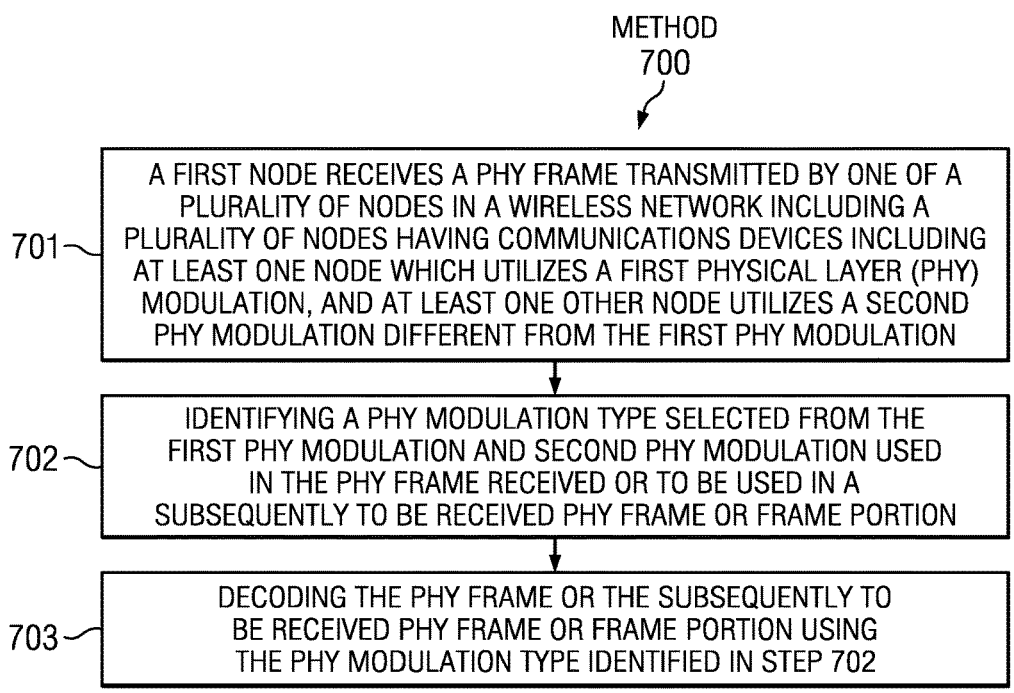
FIG. 7 is a flowchart for an example method of wireless communications in a network utilizing multiple modulations, according to an example embodiment.

FIG. 7 is a flowchart for an example method 700 of wireless communications in a network utilizing multiple modulations, according to an example embodiment. The wireless network includes a plurality of nodes having communications devices including a first node, wherein at least one node utilizes a first PHY modulation type, and at least one other node utilizes a second PHY modulation type different from the first PHY modulation type. In step 701 the first node receives a PHY frame transmitted by one of the plurality of nodes. The PHY frame received may thus be in the first PHY modulation or the second PHY modulation.

Step 702 comprises identifying a PHY modulation type selected from the first PHY modulation and second PHY modulation used in the PHY frame received or to be used in a subsequently to be received PHY frame or frame portion. Step 703 comprises decoding the PHY frame or the subsequently to be received PHY frame or frame portion using the PHY modulation type identified in step 702.

Many modifications and other embodiments of the invention will come to mind to one skilled in the art to which this Disclosure pertains having the benefit of the teachings presented in the foregoing descriptions, and the associated drawings. Therefore, it is to be understood that embodiments of the invention are not to be limited to the specific embodiments disclosed. Although specific terms are employed herein, they are used in a generic and descriptive sense only and not for purposes of limitation.

We claim:

1. A method comprising:
   receiving, by a first node, a PHY frame transmitted by a second node over a network;
   identifying, by the first node, a PHY modulation type of the PHY frame from a group that includes a first PHY modulation and a second PHY modulation that is different from the first PHY modulation, wherein the identifying of the PHY modulation type is based on a repetition interval of a field of the PHY frame; and
   decoding the PHY frame according to the identified PHY modulation type.

2. The method of claim 1, wherein the identifying comprises performing preamble detection to a preamble of the PHY frame that includes repetitions of the field to determine the PHY modulation type.

3. The method of claim 2, wherein the preamble detection comprises delayed correlation to determine the repetition interval.

4. The method of claim 2, wherein the preamble detection further comprises cross correlation.

5. The method of claim 1, wherein the PHY frame includes at least a preamble of a baseline PHY frame selected from the first PHY modulation and the second PHY modulation, the PHY frame including modulation information, and wherein the identifying comprises decoding the modulation information.

6. The method of claim 1 further comprising the first node receiving a scheduling frame which specifies when the first PHY modulation and the second PHY modulation are to be used, wherein the identifying comprises decoding the scheduling frame.

7. The method of claim 1, wherein the network utilizes allocation of first time slots to the first PHY modulation and second time slots to the second PHY modulation, and wherein the first node uses the allocation for the identifying based on a time of the receiving of the PHY frame to identify the PHY modulation type.

8. The method of claim 1, further comprising bandwidth filtering the PHY frame before the identifying of the PHY frame.

9. The method of claim 1, wherein the network comprises a smart utility network (SUN), and the first PHY modulation and the second PHY modulation are from a group consisting of: frequency-shift keying (FSK), orthogonal frequency division multiplexing (OFDM), and direct sequence spread spectrum (DSSS).

10. A modem comprising:
    a processor;
    a non-transitory memory storing instructions that, when executed by the processor, cause the processor to:
    receive a PHY frame transmitted by a node over a network;
    identify a PHY modulation type of the PHY frame from among a first PHY modulation and a second PHY modulation that is different from the first PHY modulation based on repetition of a field within the PHY frame; and
    decode the PHY frame according to the PHY modulation type.

11. The modem of claim 10, wherein the instructions that identify the PHY modulation type include instructions that perform preamble detection on a preamble of the PHY frame that includes the field to determine the PHY modulation type.

12. The modem of claim 11, wherein the instructions that perform the preamble detection include instructions that perform delayed correlation to determine the repetition of the field.

13. The modem of claim 11, wherein the instructions that perform the preamble detection include instructions that perform cross correlation.

14. The modem of claim 10, wherein the PHY frame includes at least a preamble of a baseline PHY frame selected from the first PHY modulation and the second PHY modulation, the PHY frame including modulation information which specifies the PHY modulation type, and wherein the instructions that identify the PHY modulation type include instructions that perform decoding of the modulation information.

15. The modem of claim 10, wherein the instructions include instructions to receive a scheduling frame which includes scheduled communications times for the first PHY modulation and the second PHY modulation, wherein the instructions that identify the PHY modulation type include instructions that decode the scheduling frame.

16. The modem of claim 10, wherein the network utilizes allocation of first time slots to the first PHY modulation and second time slots to the second PHY modulation, and wherein the PHY modulation is identified based on a time that the PHY frame is received.

17. The modem of claim 10, wherein the instructions include further instructions that bandwidth filter the PHY frame before the PHY modulation is identified.

18. The method of claim 1, wherein the field includes a training field.

19. The method of claim 1, wherein the identifying of the PHY modulation type includes comparing a first instance of the field in the PHY frame with a second instance of the field that is separated by at least one other instance of the field.

20. The method of claim 1, wherein the field specifies a coding property of the PHY frame.

* * * * *